US012400497B2

(12) United States Patent
Laurila et al.

(10) Patent No.: US 12,400,497 B2
(45) Date of Patent: Aug. 26, 2025

(54) ACCESS CONTROL SYSTEM AND A METHOD FOR CONTROLLING OPERATION OF AN ACCESS CONTROL SYSTEM

(71) Applicant: KONE Corporation, Helsinki (FI)

(72) Inventors: Jussi Laurila, Helsinki (FI); Visa Rauta, Helsinki (FI)

(73) Assignee: KONE Corporation, Helsinki (FI)

( * ) Notice: Subject to any disclaimer, the term of this patent is extended or adjusted under 35 U.S.C. 154(b) by 121 days.

(21) Appl. No.: 17/939,146

(22) Filed: Sep. 7, 2022

(65) Prior Publication Data

US 2023/0010991 A1 Jan. 12, 2023

Related U.S. Application Data

(63) Continuation of application No. PCT/FI2020/050245, filed on Apr. 15, 2020.

(51) Int. Cl.

*G07C 9/00* (2020.01)
*G07C 9/15* (2020.01)
*G07C 9/37* (2020.01)

(52) U.S. Cl.

CPC ........... *G07C 9/00182* (2013.01); *G07C 9/15* (2020.01); *G07C 9/37* (2020.01)

(58) Field of Classification Search

CPC ......... G07C 9/00182; G07C 9/37; G07C 9/15
USPC .......................................................... 340/5.7
See application file for complete search history.

(56) References Cited

U.S. PATENT DOCUMENTS

2013/0298466 A1* 11/2013 Osann, Jr. ................. E05G 5/02 49/98
2017/0053435 A1* 2/2017 Reymann ............... G06V 20/52
2017/0103265 A1* 4/2017 Channah .................. G07C 9/37
2018/0293523 A1 10/2018 Bergdale et al.
2020/0081418 A1* 3/2020 Dyne ..................... G06Q 10/04
2022/0228419 A1* 7/2022 Tiso ....................... G07C 9/253

FOREIGN PATENT DOCUMENTS

KR 10-2016-0091666 A 8/2016

OTHER PUBLICATIONS

Chinese Office Action and Search Report for Chinese Application No. 202080099692.3, dated Nov. 27, 2023, with English translation.
International Search Report (PCT/ISA/210) issued in PCT/FI2020/050245, dated Dec. 18, 2020.
Written Opinion of the International Searching Authority (PCT/ISA/237) issued in PCT/FI2020/050245, dated Dec. 18, 2020.

* cited by examiner

*Primary Examiner* — Kam Wan Ma
(74) *Attorney, Agent, or Firm* — Birch, Stewart, Kolasch & Birch, LLP

(57) ABSTRACT

An access control system includes: at least one gate device and a control unit. The control unit is configured to: control the at least one gate device to operate in a first operation mode, in which the gate device is arranged to allow access for the users via the gate device only from a first access direction, detect that a traffic flow of the users meets a predefined capacity limit, and control at least one gate device to change to operate in a second operation mode, in which the gate device is arranged to allow access for the users via the gate device from the first access direction and from the second access direction. The invention relates also to a method for controlling an access control system.

20 Claims, 3 Drawing Sheets

ACCESS CONTROL SYSTEM AND A METHOD FOR CONTROLLING OPERATION OF AN ACCESS CONTROL SYSTEM

CROSS REFERENCE TO RELATED APPLICATIONS

This application is a Continuation of PCT International Application PCT/FI2020/050245, filed on Apr. 15, 2020, which is hereby expressly incorporated by reference into the present application.

TECHNICAL FIELD

The invention concerns in general the technical field of access control. Especially the invention concerns access control systems.

BACKGROUND

Typically, gate devices, such as security gates and turnstiles, may comprise access control. The access control enables that only authorized users may have access through the gate device. The access control may be based on using keycards; tags; identification codes, such as personal identity number (PIN) code, ID number; and/or biometric technologies, such as fingerprint, facial recognition, iris recognition, retinal scan, voice recognition, etc.

The gate device allows one-way access through the gate device. Typically, two or more gate devices may be arranged next to each other so that at least one gate device allows access through the gate device from a first direction and at least one gate device allows access through the gate device from a second direction being opposite to the first direction.

In high traffic situations, e.g. during rush hours, the capacity of the gate device may not be enough, i.e. the number users that the gate device allows to access through the gate device may be too low. This may cause lines and jamming of the gate device.

Thus, there is need to develop further solutions in order to improve the operation of the gate devices.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an access control system and a method for controlling operation of an access control system. Another objective of the invention is that the access control system and the method for controlling operation of an access control system improve an operation capacity of one or more gate devices of the access control system.

The objectives of the invention are reached by an access control system and a method as defined by the respective independent claims.

According to a first aspect, an access control system is provided, wherein the access control system comprises: at least one gate device and a control unit configured to: control the at least one gate device to operate in a first operation mode, in which the gate device is arranged to allow access for the users via the gate device only from a first access direction; detect that a traffic flow of the users meets a predefined capacity limit; and control at least one gate device to change to operate in a second operation mode, in which the gate device is arranged to allow access for the users via the gate device from the first access direction and from the second access direction.

The access control system may further comprise at least one imaging device configured to obtain image data from the first access direction and from the second access direction, wherein the control unit may be configured to: receive the obtained image data from the first access direction in the first operation mode of the gate device or from the first access direction and the second access direction in the second operation mode of the gate device, identify authorized users approaching the at least one gate device based on the received image data and prestored data associated with the authorized users by using facial recognition-based identification, and control the at least one gate device to allow the access only for the authorized users via the at least one gate device.

Alternatively or in addition, the control unit may further be configured to: detect that the traffic flow of the users is less than the predefined capacity limit and control the at least one gate device to change back to operate in the first operation mode.

In the second operation mode the gate device may be arranged to allow simultaneous access of the users via the gate device from the first access direction and from the second access direction.

The capacity limit of the at least one gate device may be defined by a predefined number of users accessing via the at least one gate device per a predefined time period.

Alternatively or in addition, the access control system may further comprise at least one indication device arranged to provide a visual indication indicating the first access direction and/or the second access direction depending on the operation mode of the gate device.

Moreover, in the second operation mode the at least one indication device may be arranged to provide visual indication indicating two lanes, wherein one of the two lanes may indicate the first access direction and the other of the two lanes may indicate the second access direction.

Alternatively or in addition, the at least one indication device may comprise one or more displays on which the visual indication may be displayed and/or one or more or projectors configured to project the visual indication on a surface in a vicinity of the at least one gate device.

According to a second aspect, a method for controlling operation of an access control system is provided, wherein the access control system comprises at least one gate device allowing access for users via the at least one gate device and a control unit, wherein the method comprises: controlling, by the control unit, the at least one gate device to operate in a first operation mode, in which the gate device is arranged to allow access for the users via the gate device only from a first access direction; detecting, by the control unit, that a traffic flow of the users meets a predefined capacity limit; and controlling, by the control unit, at least one gate device to change to operate in a second operation mode, in which the gate device is arranged to allow access for the users via the gate device from the first access direction and from a second access direction.

The system may further comprise at least one imaging device configured to obtain image data from the first access direction and from the second access direction, wherein the method may further comprise: receiving, by the control unit, the image data from the first access direction in the first operation mode of the gate device or from the first access direction and the second access direction in the second operation mode of the gate device; identifying, by the control unit, authorized users approaching the at least one gate device based on the received image data and prestored data associated with the authorized users by using facial recognition-based identification; and controlling, by the control unit, the at least one gate device to allow the access only for the authorized users via the at least one gate device.

Alternatively or in addition, the method may further comprise: detecting, by the control unit, that the traffic flow of the users is less than the predefined capacity limit; and controlling, by the control unit, the at least one gate device to change back to operate in the first operation mode.

In the second operation mode the gate device may be arranged to allow simultaneous access of the users via the gate device from the first access direction and from the second access direction.

The capacity limit of the at least one gate device may be defined by a predefined number of users accessing via the at least one gate device per a predefined time period.

Alternatively or in addition, the method may further comprise providing a visual indication indicating the first access direction and/or the second access direction depending on the operation mode of the gate device.

Moreover, the method may further comprise providing in the second operation mode a visual indication indicating two lanes, wherein one of the two lanes may indicate the first access direction and the other of the two lanes may indicate the second access direction.

Alternatively or in addition, the visual indication may be displayed on one or more displays and/or projected on a surface in a vicinity of the at least one gate device.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
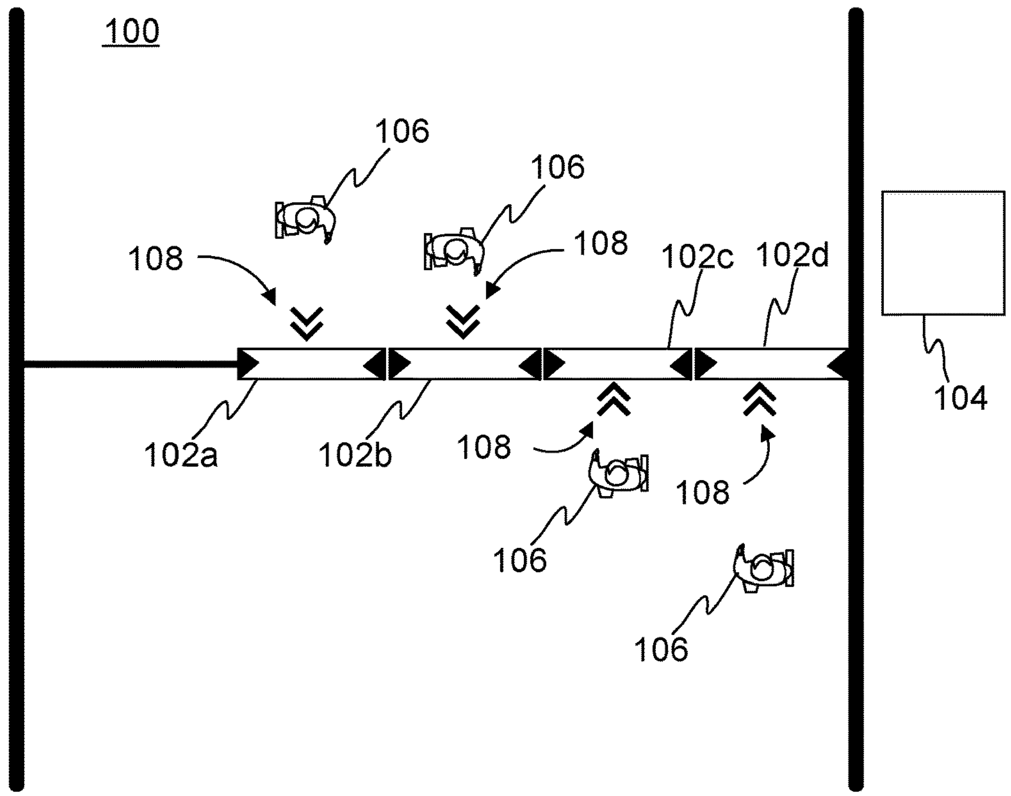
FIGS. 1A-1C illustrate schematically an example of an access control system according to the invention.
Figure 1B:
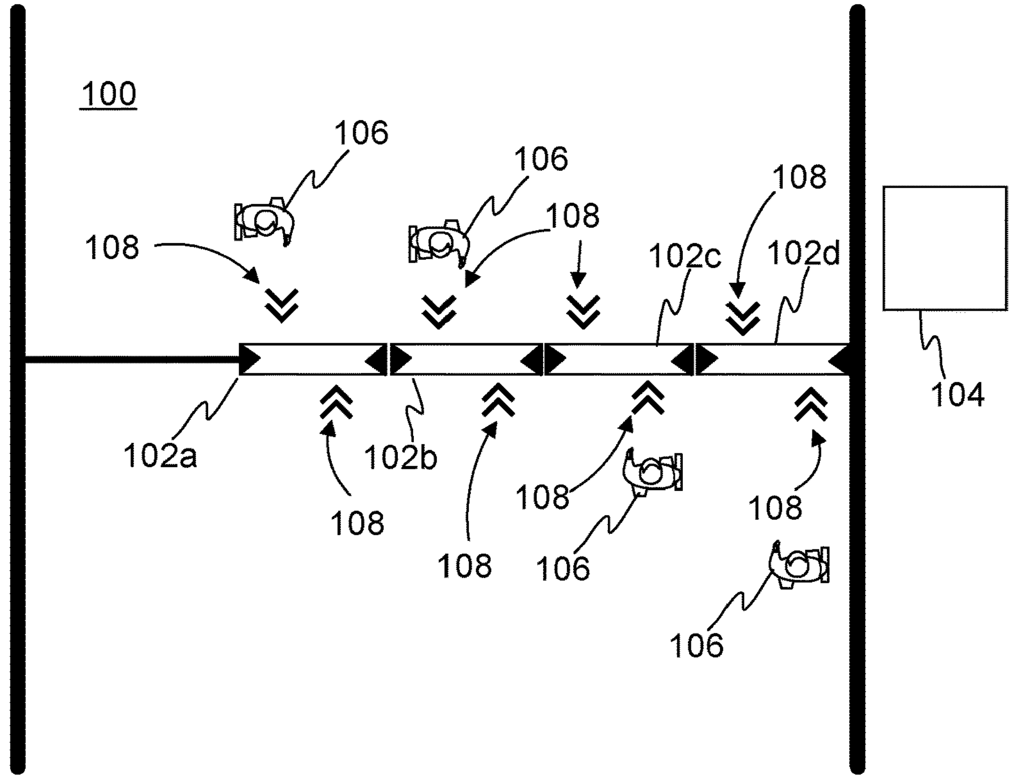
Figure 1C:
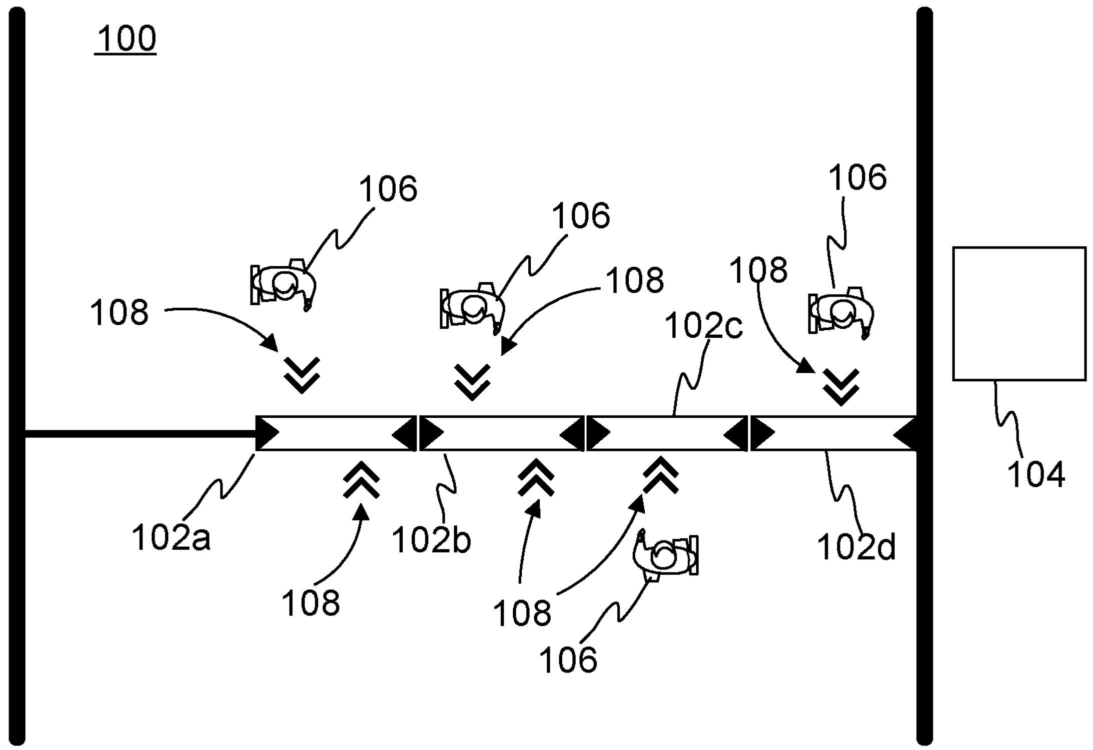

FIGS. 1A-1C illustrate schematically an example of an access control system 100 according to the invention. The access control system 100 comprises at least one gate device 102*a*-102*d* allowing access for users 106 via the at least one gate devices 102*a*-102*d* and a control unit 104. In the example of FIGS. 1A-1C the access control system 100 comprises four gate devices 102*a*-102*d* arranged next to each other. However, the invention is not limited to that and the access control system 100 may comprise any other number of gate devices 102*a*-102*d*.

In the example of FIG. 1A the gate devices 102*a*-102*d* are configured to operate in a first operation mode. In the first operation mode of the gate device 102*a*-102*d* the gate device 102*a*-102*d* is arranged to allow access for the users 106 via the gate device 102*a*-102*d* only from one access direction. In other words, in the first operation mode the gate device 102*a*-102*d* allows one-way access via the gate device 102*a*-102*d*.

In the example of FIG. 1B the gate devices 102*a*-102*d* are configured to operate in a second operation mode. In the second operation mode of the gate device 102*a*-102*d* the gate device 102*a*-102*d* is arranged to allow access for the users 106 via the gate device 102*a*-102*d* from both access directions. In other words, in the second operation mode the gate device 102*a*-102*d* allow two-way access via the gate device 102*a*-102*d*. In the example of FIG. 1B all gate devices 102*a*-102*d* are configured to operate in the second operation mode.

In the example of FIG. 1C the gate devices 102*c* and 102*d* are configured to operate in the first operation mode in which the gate devices 102*c* and 102*d* are arranged to allow access for the users 106 via the gate device 102*c* and 102*d* only from one access direction, and the gate devices 102*a* and 102*b* are configured to operate in the second operation mode, in which the gate devices 102*a* and 102*b* are arranged to allow access for the users 106 via the gate devices 102*a* and 102*b* from both access directions.

The access control system 100 may further comprise at least one indication device (not shown in FIGS. 1A-1C) arranged to provide visual indication 108 indicating the access direction(s) of the gate devices 102*a*-102*d* depending on the operation mode of the gate devices 102*a*-102*d*. The at least one indication device may comprise one or more displays on which the visual indication 108 may be displayed and/or one or more or projectors configured to project the visual indication 108 on a surface in a vicinity of, i.e. close to, the gate device 102*a*-102*d* as illustrated in the example of FIGS. 1A-1C, wherein the visual indications 108 are projected on a surface, e.g. a floor, in front of the gate devices 102*a*-102*a* in the access direction(s) of the gate devices 102*a*-102*d*.

The control unit 104 is configured to control the operations of the access control system 100. The control unit 104 may be external entity or it may be implemented as a part of the at least one gate device 102*a*-102*d*. In the example of FIGS. 1A-1C, the control unit 104 is an external entity. The external entity herein means an entity that locates separate from the at least one gate device 102*a*-102*d*. The implementation of the control unit 104 may be done as a stand-alone control entity or as a distributed control environment between a plurality of stand-alone control entities, such as a plurality of servers providing distributed control resource. In other words, if the access control system 100 comprises more than one gate device 102*a*-102*d*, the control unit 104 may be implemented as one centralized stand-alone control entity configured to control all gate devices 102*a*-102*d* as illustrated in the examples of FIGS. 1A-1C or the control unit 104 may be implemented as a distributed control environment comprising a plurality of stand-alone control entities, each configured to control one or more gate devices 102*a*-102*d*. The control unit 104 may be communicatively coupled to the at least one gate device 102*a*-102*d* and any other entities of the access control system 100. The communication between the control unit 104 and the other entities of the access control system 100 may be based on one or more known communication technologies, either wired or wireless.

Figure 2A:
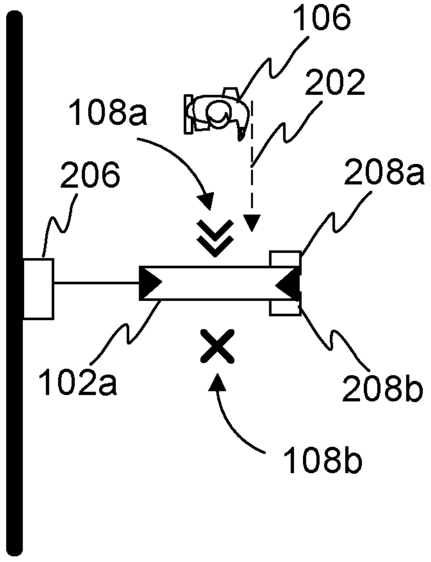
FIG. 2A an example of operation of a gate device according to the invention in a first operation mode.
Figure 2B:
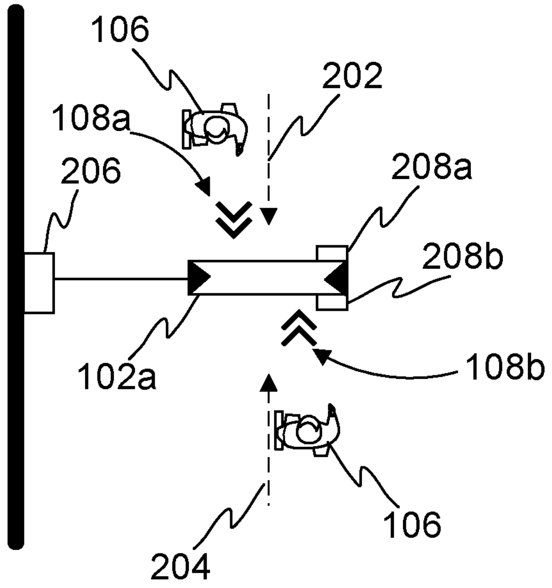
FIG. 2B an example of operation of a gate device according to the invention in a second operation mode.

The invention is described next by using one gate device 102*a* as illustrated in an example of FIGS. 2A and 2B. However, the invention is not limited to that and when the access control system 100 according to the invention comprises more than one gate device 102*a*-102*d*, each gate device 102*a*-102*d* operates as will be described by referring to the one gate device 102*a*. For sake of clarity the control unit 104 is not shown in FIGS. 2A and 2B.

The control unit 104 may be configured by default to control the gate device 102*a* to operate in the first operation mode, in which the gate device 102*a* is arranged to allow access for the users 106 via the gate device 102*a* only from one access direction, e.g. a first access direction 202 of the gate device 102*a*. The allowing the access via the gate device 102*a* may comprise also indicating the access via the gate device 102*a* by means of the visual indication 108, 108*a*, 108*b* as will be described. FIG. 2A illustrates schematically an example of the operation of the gate device 102*a* in the first operation mode. The control unit 104 may detect that the traffic flow of the users 106 meets a predefined capacity limit based on traffic flow data of the users 106. The capacity limit of the gate device 102*a* may be defined by a predefined number of users 106 accessing via the gate device 102*a* per a predefined time period, e.g. 30 users per one minute. In response to detecting that the traffic flow of the users 106 meets the predefined capacity limit, the control unit 104 is configured control the gate device 102*a* to change to operate in the second operation mode, in which the gate device 102*a* is arranged to allow access for the users via the gate device 102*a* from both access directions, e.g. from the first access direction 202 and from a second access direction 204 of the gate device 102*a*. The capability of operating in the first operation mode and in the second operation mode improves an operation capacity of the at least one gate device 102*a*-102*d* of the access control system 100. Alternatively or in addition, the capability of operating in the first operation mode and in the second operation mode improves the versatility of the at least one gate device 102*a*-102*d* of the access control system 100. In the second operation mode the gate device 102*a* may be arranged to allow simultaneous and/or non-simultaneous access of the users via the gate device 102*a* from both access directions, e.g. from the first access direction 202 and from the second access direction 204. In other words, the users 106 are allowed to access via the gate device 102*a* simultaneously from both access directions 202, 204 or one user 106 at a time, e.g. first the user 106*a* from the first access direction 202 and then the user 106*b* from the second access direction 204 or vice versa. FIG. 2B illustrates schematically an example of the operation of the gate device 102*a* in the second operation mode.

According to an example embodiment of the invention, when the gate device 102*a* is operating in the second mode, the control unit 104 may further be configured to detect that the traffic flow of the users 106 is less than the predefined capacity limit based the traffic flow data. In response to detecting that the traffic flow of the users 106 is less than the predefined capacity limit, the control unit 104 may be configured to control the gate device 102*a* to change back to operate in the first operation mode.

According to an example embodiment of the invention, the access control system 100 may further comprise at least one imaging device 206 configured to obtain image data from both access directions, e.g. from the first access direction 202 and from the second access direction 204. The at least one imaging device 206 may comprise one or more optical imaging devices, e.g. cameras. The at least one imaging device 206 may enable detection and/or identification of a user 106 at a distance away from the gate device 102*a*. The distance may be e.g. between 0 to 10 meters from the gate device 102*a* and preferably between 1 to 2 meters, 1 to 3 meters or 1 to 5 meters. The at least one imaging device 206 may be arranged to the gate device 102*a* or in a vicinity of, i.e. close to, the gate device 102*a*, e.g. to a wall, a ceiling and/or to a separate support device. In the example of FIGS. 2A and 2B the at least one imaging device 206 is arranged to a wall close to the gate device 102*a* so that the at least one imaging device 206 is capable to obtain the image data from both access directions 202, 204.

The control unit 104 may be configured to receive the obtained image data from the first access direction 202 in the first operation mode of the gate device 102*a* or from the first access direction 202 and the second access direction 204 in the second operation mode of the gate device 102*a*. Furthermore, the control unit 104 may be configured to identify authorized users approaching the gate device 102*a* based on the received image data and prestored data associated with the authorized users by using facial recognition-based identification. In other words, the received image data may be compared to the prestored data in order to find a possible match from the prestored data. The prestored data may be stored in a memory or a database connected to the control unit 104, or in a cloud service accessible via a network connection. For example, if the access control system 100 is arranged in a building, image data relating to people regularly residing, e.g. working or living, in the building may have been prestored in the memory or database. The control unit 104 may be configured to control the gate device 102*a* to allow access only for the authorized users via the gate device 102 in the first operating mode of the gate device 102*a* and/or in the second operating mode of the gate device 102*a*.

The gate device 102*a* may comprise a barrier device, such as door panel(s), turnstile, boom or any other barrier device, for preventing unauthorized users without an access via the gate device 102*a*. Alternatively or in addition, the gate device 102*a* may comprise one or more alarm devices, e.g. visual and/or audio alarm devices, for generating an alarm, if an unauthorized user without an access via the gate device 102 attempts to pass through the gate device 102*a*. The gate device 102*a* may be by default at a state allowing an unrestricted access via the gate device 102*a*. In other words, the gate device 102*a* is maintained at the state allowing the unrestricted access via the gate device 102*a*. If the received image data relates to an unauthorized user without an access via the gate device 102*a*, the control unit 104 may be configured to control the barrier device to prevent, i.e. restrict, the access via the gate device 102*a*, e.g. by closing the barrier device of the gate device 102*a*. Alternatively or in addition, the control unit 104 may be configured to control the one or more alarm devices to generate an alarm to indicate an access of an unauthorized-user, if the received image data relates to an unauthorized user without an access via the gate device 102*a*. Alternatively, the gate device 102*a* may be by default at a state preventing, i.e. restricting, the access of the users via the gate device 102*a*, i.e. the gate device 102 may be in a closed state. If the received image data relates to an authorized user with an access via the gate device 102*a* the control unit 104 may be configured to control the barrier device to provide the access via the gate device 102*a*, e.g. by opening the barrier device of the gate device 102.

The access control system 100 may comprise one or more sensor devices, e.g. people counter devices, for counting the number of users 106 accessing via the at least one gate device 102*a*-102*d* in order to provide the traffic flow data. The one or more sensor devices may be based e.g. on infrared imaging, thermal imaging, video imaging, and/or wireless local area networks, e.g. Wi-Fi. The video imaging-based user counting may use algorithms, e.g. machine learning algorithms, to count the number or users 106 accessing via the at least one gate device 102*a*-102*d* from image data obtained with a video imaging device, e.g. camera. According to an example embodiment of the invention, the at least one imaging device 206 may be used in the video imaging-based user counting. The control unit 104 may obtain the traffic flow data from the one or more sensor devices constantly, i.e. in real time, in order to obtain real-time traffic flow data. Alternatively or in addition, the traffic flow data may be based on statistics of traffic flow data gathered during a predefined term by the one or more sensor devices. Alternatively or in addition, the traffic flow data may be based on estimated traffic flow, e.g. based on time of day. For example, it may be estimated that during typical rush hour times, e.g. in the morning and/or in the afternoon, the traffic flow may be high and thus meet the predefined capacity limit of the gate device 102*a*.

As discussed above, the access control system 100 may comprise at least one indication device 208*a*, 208*b* arranged to provide a visual indication 108 indicating the access direction, e.g. the first access direction 202 and/or the second access direction 204, depending on the operation mode of the gate device 102*a*. The at least one indication device 208*a*, 208*b* may comprise one or more displays on which the visual indication 108 may be displayed and/or one or more or projectors configured to project the visual indication 108 on a surface in a vicinity of, i.e. close to, the gate device 102*a*. In the example of FIG. 2A, wherein the gate device 102*a* is operating in the first operating mode of the gate device 102*a*, the at least one indication device 208*a*, 208*b* comprises a first projector 208*a* arranged to the gate device 102*a* and configured to project the visual indication 108*a* indicating the access direction, i.e. the first access direction 202, on a surface in front of the gate device 102*a* on the access direction side of the gate device 102*a*, i.e. on the first access direction 202 side of the gate device 102*a*. In the example of FIG. 2A the at least one indication device 208*a*, 208*b* comprises a second projector 208*b* arranged to the gate device 102*a* and configured to project an optional further visual indication 108*b* indicating the prohibited access direction, i.e. the second access direction 204, on a surface in front of the gate device 102*a* on the prohibited access direction side of the gate device 102*a*, i.e. on the second access direction 204 side of the gate device 102*a*.

In the second operation mode of the gate device 102*a* the at least one indication device 208*a*, 208*b* may be arranged to provide visual indication 108*a*, 108*b* indicating two lanes, wherein one of the two lanes indicates the first access direction 202 and the other of the two lanes indicates the second access direction 204. This is illustrated e.g. in the example of FIG. 2B. In the example of FIG. 2B, wherein the gate device 102*a* is operating in the second operating mode of the gate device 102*a*, the at least one indication device 208*a*, 208*b* comprises the first projector 208*a* and the second projector 208*b*. The first projector 208*a* is arranged to the gate device 102*a* and configured to project the visual indication 108*a* indicating the first access direction 202 on a surface in front of the gate device 102*a* on the first access direction 202 side of the gate device 102*a*. The second projector 208*b* is arranged to the gate device 102*a* and configured to project the visual indication 108*b* indicating the second access direction 204 on a surface in front of the gate device 102*a* on the second access direction 204 of the gate device 102*a*.

Figure 3:
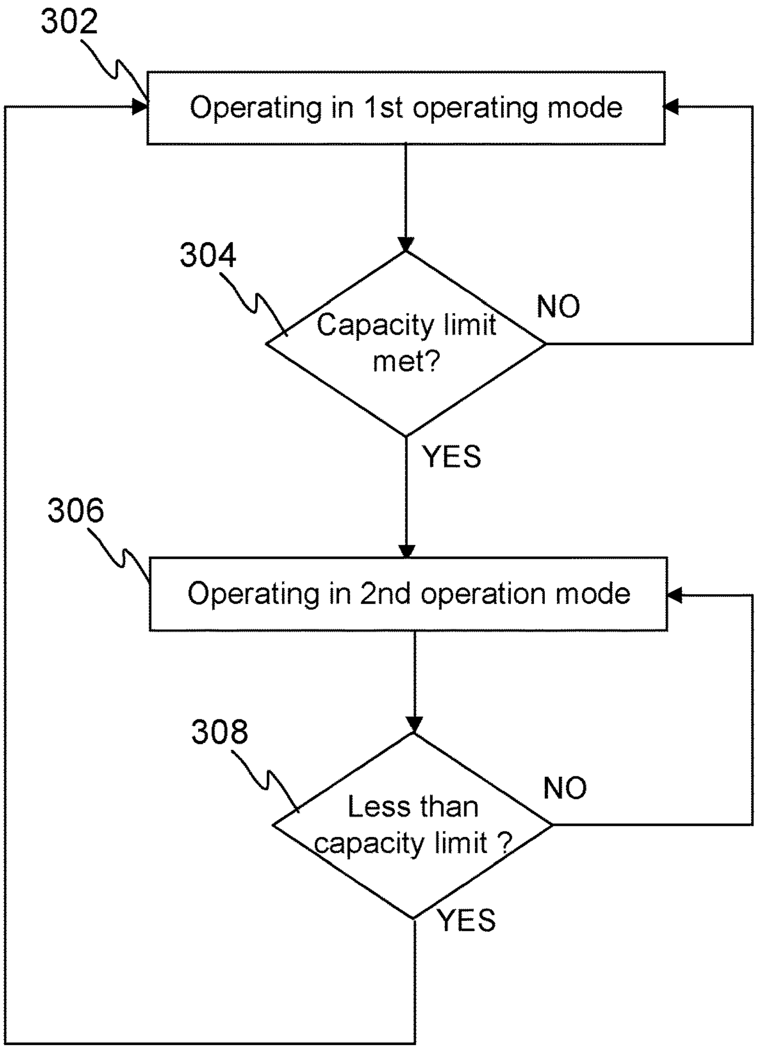
FIG. 3 illustrates schematically an example of a method according to the invention.

Next an example of the method according to the invention is described by referring to FIG. 3. FIG. 3 schematically illustrates the invention as a flow chart.

At a step 302, the control unit 104 controls the gate device 102*a* to operate by default in a first operation mode, in which the gate device 102*a* is arranged to allow access for the users 106 via the gate device 102 only from one direction, e.g. a first access direction 202. In other words, in the first operation mode the gate device 102*a* allows one-way access via the gate device 102*a*. The allowing the access via the gate device 102*a* may comprise also indicating the access via the gate device 102*a* by means of the visual indication 108, 108*a*, 108*b* as will be described.

At a step 304, the control unit 104 detects that a traffic flow of the users 106 meets a pre-defined capacity limit based on traffic flow data of the users 106. The capacity limit of the gate device 102*a* may be defined by a predefined number of users 106 accessing via the gate device 102*a* per a predefined time period, e.g. 30 users per one minute.

At a step 306, in response to detecting that the traffic flow of the users 106 meets the predefined capacity limit, the control unit 104 controls the gate device 102*a* to change to operate in a second operation mode, in which the gate device 102*a* is arranged to allow access for the users 106 via the gate device 102*a* from the both access directions, e.g. from the first access direction 202 and from the second access direction 204. In the second operation mode the gate device 102*a* may be arranged to allow simultaneous and/or non-simultaneous access of the users 106 via the gate device 102*a* from both access directions, e.g. from the first access direction 202 and from the second access direction 204. In other words, the users 106 are allowed to access via the gate device 102*a* simultaneously from both access directions 202, 204 or one user 106 at a time, e.g. first the user 106*a* from the first access direction 202 and then the user 106*b* from the second access direction 204 or vice versa.

According to an example embodiment of the invention, when the gate device 102*a* is operating in the second mode, at a step 306 the control unit 104 may further detect that the traffic flow of the users 106 is less than the predefined capacity limit based the traffic flow data. In response to detecting that the traffic flow of the users 106*a* is less than the predefined capacity limit, the control unit 104 may control the gate device 102*a* to change back to operate in the first operation mode as in the step 302.

According to an example embodiment of the invention, the access control system 100 may further comprise at least one imaging device 206 for obtaining image data from both access directions, e.g. from the first access direction 202 and from the second access direction 204. The at least one imaging device 206 may enable detection and/or identification of a user 106 at a distance away from the gate device 102*a*. The method may comprise receiving, by the control unit 104, the image data from the first access direction 202 in the first operation mode of the gate device 102*a* or from the first access direction 202 and from the second access direction 204 in the second operation mode of the gate device 102*a*. The method may further comprise identifying, by the control unit 104, authorized users approaching the gate device 102*a* based on the received image data and prestored data associated with the authorized users by using facial recognition-based identification. In other words, the received image data may be compared to the prestored data in order to find a possible match from the prestored data. The prestored data may be stored in a memory or a database connected to the control unit 104, or in a cloud service accessible via a network connection. For example, if the access control system 100 is arranged in a building, image data relating to people regularly residing, e.g. working or living, in the building may have been prestored in the memory or database. The method may further comprise controlling, by the control unit 104, the gate device 102*a* to allow the access only for the authorized users via the gate device 102*a* in the first operating mode of the gate device 102*a* and/or in the second operating mode of the gate device 102*a*.

According to an example embodiment of the invention, the method comprises provide the traffic flow data by counting the number of users 106 accessing via the at least one gate device 102*a*-102*d* with one or more sensor devices, e.g. people counter devices. The one or more sensor devices may be based e.g. on infrared imaging, thermal imaging, video imaging, and/or wireless local area networks, e.g. Wi-Fi. The video imaging-based user counting may use algorithms, e.g. machine learning algorithms, to count the number or users 106 accessing via the at least one gate device 102*a*-102*d* from image data obtained with a video imaging device, e.g. camera. According to an example of the invention, the at least one imaging device 206 may be used in the video imaging-based user counting. The control unit 104 may obtain the traffic flow data from the one or more sensor devices constantly, i.e. in real time, in order to obtain real-time traffic flow data. Alternatively or in addition, the traffic flow data may be based on statistics of traffic flow data gathered during a predefined term by the one or more sensor devices. Alternatively or in addition, the traffic flow data may be based on estimated traffic flow, e.g. based on time of day. For example, it may be estimated that during typical rush hour times, e.g. in the morning and/or in the afternoon, the traffic flow may be high and thus meet the predefined capacity limit of the gate device 102*a*.

According to an example embodiment of the invention, the method may further comprise providing, by at least one indication device 208*a*, 208*b*, a visual indication 108 indicating the access direction, e.g. the first access direction 202 and/or the second access direction 204, depending on the operation mode of the gate device 102*a*. The visual indication 108, 108*a*, 108*b* may be displayed on one or more displays and/or projected on a surface in a vicinity of, i.e. close to, the gate device 102*a*.

According to an example embodiment of the invention, the method may comprise providing, by at least one indication device 208*a*, 208*b*, in the second operation mode a visual indication 108*a*, 108*b* indicating two lanes, wherein one of the two lanes indicates the first access direction 202 and the other of the two lanes indicates the second access direction 204.

Figure 4:
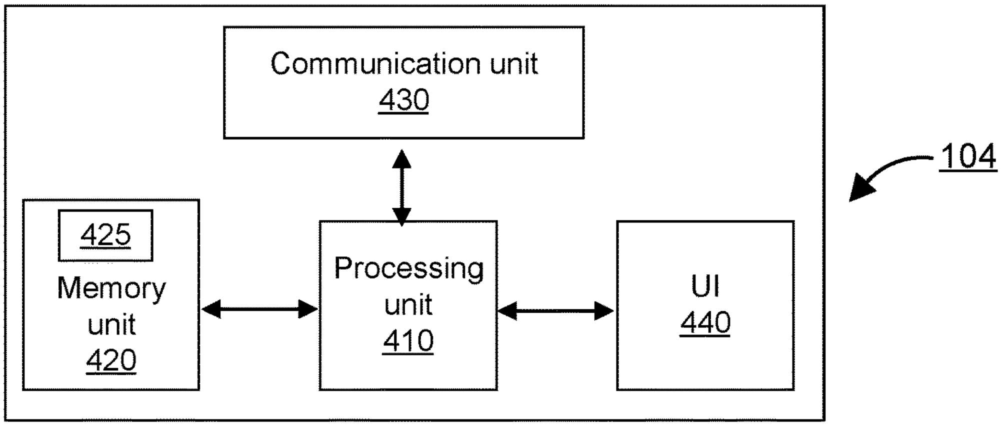
FIG. 4 illustrates schematically an example of components of a control unit according to the invention.

FIG. 4 schematically illustrates an example of components of the control unit 104 according to the invention. The control unit 104 may comprise a processing unit 410 comprising one or more processors, a memory unit 420 comprising one or more memories, a communication unit 430 comprising one or more communication devices, and possibly a user interface (UI) unit 440. The memory unit 420 may store portions of computer program code 425 and any other data, and the processing unit 410 may cause the control unit 104 to operate as described by executing at least some portions of the computer program code 425 stored in the memory unit 420. The communication unit 430 may be based on at least one known communication technologies, either wired or wireless, in order to exchange pieces of information as described earlier. The communication unit 430 provides an interface for communication with any external unit, such as the at least one gate device 102*a*-102*d*, the at least one imaging device 206, the at least one indication device 208*a*, 208*b*, database and/or any external entities or systems. The communication unit 430 may comprise one or more communication devices, e.g. radio transceiver, antenna, etc. The user interface 440 may comprise I/O devices, such as buttons, key-board, touch screen, microphone, loudspeaker, display and so on, for receiving input and outputting information. The computer program 425 may be stored in a non-statutory tangible computer readable medium, e.g. an USB stick or a CD-ROM disc.

The verb "meet" in context of a predefined capacity limit is used in this patent application to mean that a predefined condition is fulfilled. For example, the predefined condition may be that the predefined capacity limit is reached and/or exceeded.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An access control system comprising:

at least one gate device, and a control unit configured to:

control the at least one gate device to operate in a first operation mode, in which the gate device is arranged to allow access for the users via the gate device only from a first access direction, detect that a traffic flow of the users meets a predefined capacity limit, control at least one gate device to change to operate in a second operation mode, in which the gate device is arranged to allow access for the users via the gate device from the first access direction and from the second access direction based on the detected traffic flow of the users meeting the predefined capacity limit, control the gate device, in the second mode, to close and act as a barrier restricting access in the first access direction and the second access direction in response to an unauthorized user being detected as approaching the gate device, and control the gate device, in the second mode, to remain open to allow access in both the first direction and the second direction simultaneously in response to no unauthorized users being detected as approaching the gate device.

2. The access control system according to claim 1, further comprising at least one imaging device configured to obtain image data from the first access direction and from the second access direction, wherein the control unit is configured to:

receive the obtained image data from the first access direction in the first operation mode of the gate device or from the first access direction and the second access direction in the second operation mode of the gate device, identify authorized users approaching the at least one gate device based on the received image data and prestored data associated with the authorized users by using facial recognition-based identification, and control the at least one gate device to allow the access only for the authorized users via the at least one gate device.

3. The access control system according to claim 1, wherein the control unit is further configured to:

detect that the traffic flow of the users is less than the predefined capacity limit, and control the at least one gate device to change back to operate in the first operation mode.

4. The access control system according claim 1, wherein in the second operation mode the gate device is arranged to allow simultaneous access of the users via the gate device from the first access direction and from the second access direction.

5. The access control system according to claim 1, wherein the capacity limit of the at least one gate device is defined by a predefined number of users accessing via the at least one gate device per a predefined time period.

6. The access control system according claim 1 further comprising at least one indication device arranged to provide a visual indication indicating the first access direction and/or the second access direction depending on the operation mode of the gate device.

7. The access control system according to claim 6, wherein in the second operation mode the at least one indication device is arranged to provide visual indication indicating two lanes, wherein one of the two lanes indicates the first access direction and the other of the two lanes indicates the second access direction.

8. The access control system according to claim 6, wherein the at least one indication device comprises one or more displays on which the visual indication is displayed and/or one or more or projectors configured to project the visual indication on a surface in a vicinity of the at least one gate device.

9. A method for controlling operation of an access control system comprising at least one gate device and a control unit, the method comprises:

controlling, by the control unit, the at least one gate device to operate in a first operation mode, in which the gate device is arranged to allow access for the users via the gate device only from a first access direction, detecting, by the control unit, that a traffic flow of the users meets a predefined capacity limit, controlling, by the control unit, at least one gate device to change to operate in a second operation mode, in which the gate device is arranged to allow access for the users via the gate device from the first access direction and from a second access direction based on the detected traffic flow of the users meeting the predefined capacity limit, controlling, by the control unit, the gate device, in the second mode, to close and act as a barrier restricting access in the first access direction and the second access direction in response to an unauthorized user being detected as approaching the gate device, and controlling, by the control unit, the gate device, in the second mode, to remain open to allow access in both the first direction and the second direction simultaneously in response to no unauthorized users being detected as approaching the gate device.

10. The method according to claim 9, wherein the system further comprises at least one imaging device configured to obtain image data from the first access direction and from the second access direction, wherein method further comprising:

receiving, by the control unit, the image data from the first access direction in the first operation mode of the gate device or from the first access direction and the second access direction in the second operation mode of the gate device, identifying, by the control unit, authorized users approaching the at least one gate device based on the received image data and prestored data associated with the authorized users by using facial recognition-based identification, and controlling, by the control unit, the at least one gate device to allow the access only for the authorized users via the at least one gate device.

11. The method according to claim 9, wherein the method further comprises:

detecting, by the control unit, that the traffic flow of the users is less than the predefined capacity limit, and controlling, by the control unit, the at least one gate device to change back to operate in the first operation mode.

12. The method according to claim 9, wherein in the second operation mode the gate device is arranged to allow simultaneous access of the users via the gate device from the first access direction and from the second access direction.

13. The method according to claim 9, wherein the capacity limit of the at least one gate device is defined by a predefined number of users accessing via the at least one gate device per a predefined time period.

14. The method according to claim 9, wherein the method further comprises providing a visual indication indicating the first access direction and/or the second access direction depending on the operation mode of the gate device.

15. The method according to claim 14, wherein the method further comprises providing in the second operation mode a visual indication indicating two lanes, wherein one of the two lanes indicates the first access direction and the other of the two lanes indicates the second access direction.

16. The method according to claim 14, wherein the visual indication is displayed on one or more displays and/or projected on a surface in a vicinity of the at least one gate device.

17. The access control system according to claim 2, wherein the control unit is further configured to:

detect that the traffic flow of the users is less than the predefined capacity limit, and control the at least one gate device to change back to operate in the first operation mode.

18. The access control system according claim 2, wherein in the second operation mode the gate device is arranged to allow simultaneous access of the users via the gate device from the first access direction and from the second access direction.

19. The access control system according claim 3, wherein in the second operation mode the gate device is arranged to allow simultaneous access of the users via the gate device from the first access direction and from the second access direction.

20. The access control system according to claim 2, wherein the capacity limit of the at least one gate device is defined by a predefined number of users accessing via the at least one gate device per a predefined time period.

* * * * *